Sept. 22, 1970            C. HIRST            3,529,817
SEESAW WITH RESILIENT RING BUFFER DEVICE
Filed March 5, 1968            2 Sheets-Sheet 1
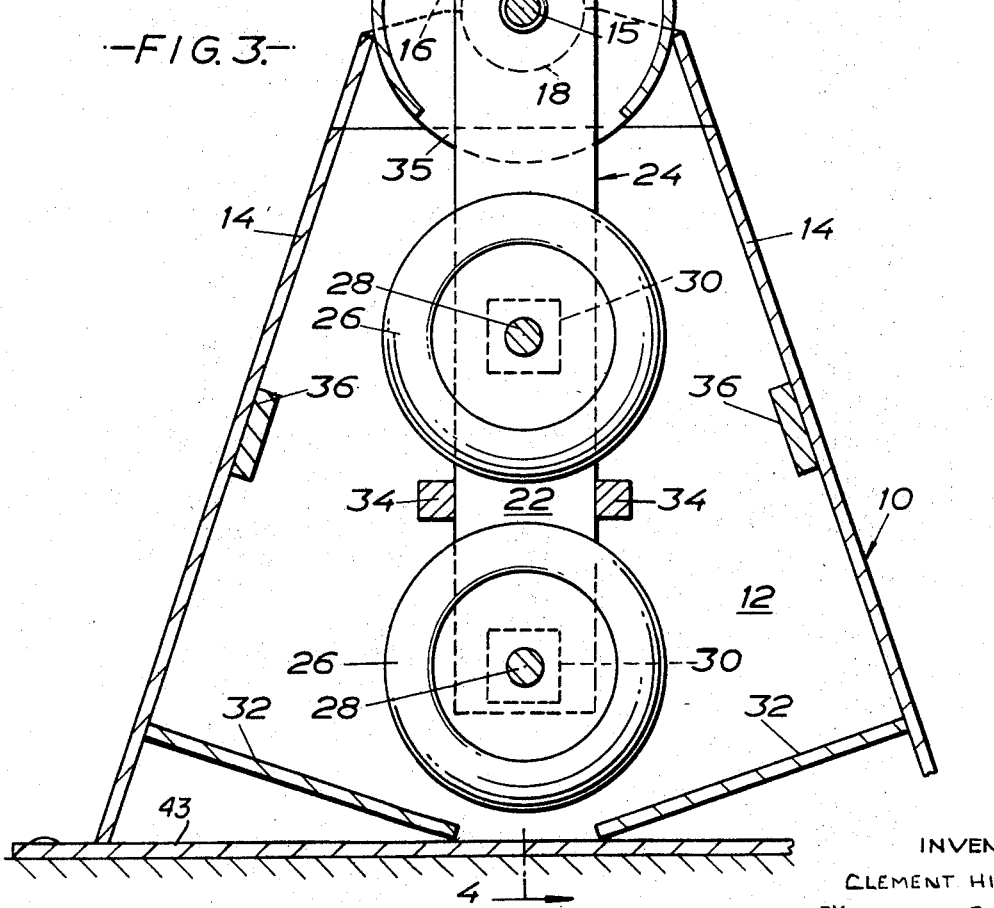
INVENTOR.
CLEMENT HIRST

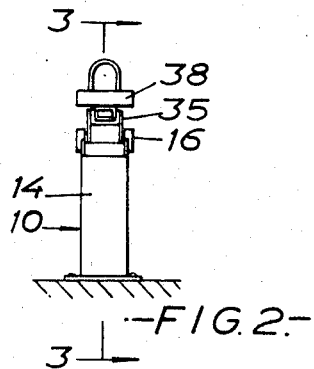
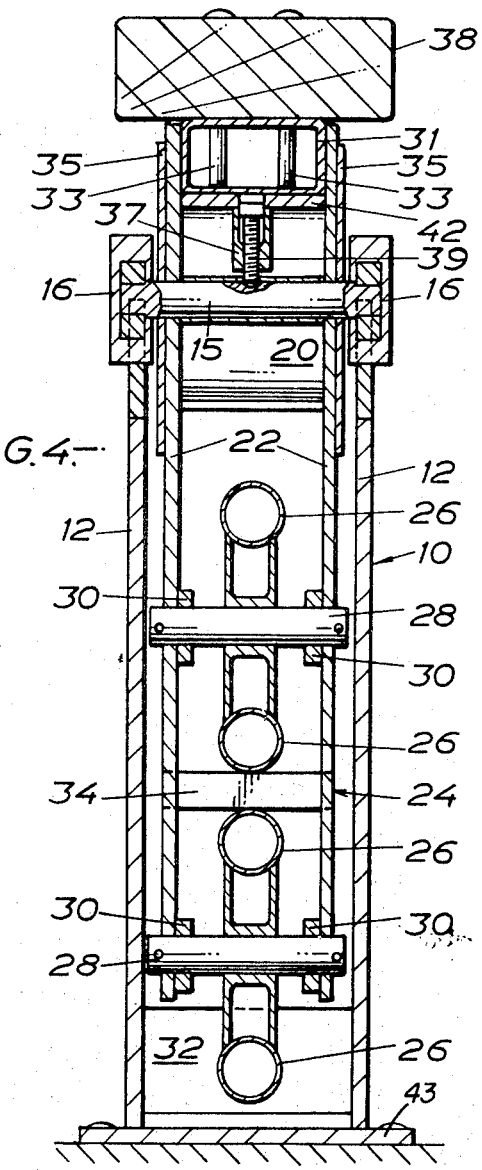

United States Patent Office 3,529,817
Patented Sept. 22, 1970

3,529,817
SEESAW WITH RESILIENT RING BUFFER DEVICE
Clement Hirst, Lightcliffe, near Halifax, England, assignor to B. Hirst & Sons Ltd., Halifax, England, a corporation of Great Britain
Filed Mar. 5, 1968, Ser. No. 710,463
Claims priority, application Great Britain, Mar. 15, 1967, 12,113/67, Patent 1,152,074
Int. Cl. A63g *11/00*
U.S. Cl. 272—54                    9 Claims

ABSTRACT OF THE DISCLOSURE

A non-bump seesaw has a plank 38 pivoted on a hollow support column 10. A pendulum arm 24 depends from the plank and within the support column said pendulum arm 24 carrying a buffer device. This buffer device comprises two rubber tires 26, each rotatable, mounted on spindles 28 secured to the pendulum arm 24. The buffer devices engage with either of two opposed side walls of the column to cushion rocking movement of the plank.

---

There have been many attempts to produce satisfactory non-bumper seesaws, and whilst some of these do prevent the seesaw plank from striking the ground with a bump, they are expensive and sometimes difficult to maintain.

According to this invention a seesaw comprises a pivoted plank mounted on a hollow support column within which a depending pendulum arm fixed to and movable with the plank carries a resilient buffer device engageable with opposed walls of the support column to cushion the swinging of the plank at each end of its permitted oscillation.

Preferably the buffer device comprises a ring of resilient material which will deform under compressive load to provide the cushioning effect. Conveniently it may take the form of a rubber tire which may be a solid or pneumatic tire. Again in the preferred arrangement, the pendulum arm carries two tires mounted one above the other and the opposed walls of the column against which the tires engage slope inwardly towards the top. The arrangement may be such that the upper tire engages with a wall before the lower tire so that when the seesaw is at one extreme position, both tires are compressed substantially the same amount.

It is also preferred that the tire or the lower tire of two tires engages with a plate to rotate said tire during the movement of the pendulum arm so as to partially cushion the pendulum arm and to effect even distribution of wear on the tire.

The construction and operation of a non-bumber seesaw in accordance with the invention will now be described by way of example only, and with reference to the accompanying drawings in which:

FIG. 1 is a front view of a non-bumper seesaw,
FIG. 2 is an end view of the seesaw,
FIG. 3 is a sectional view looking in the direction of arrows 3–3 in FIG. 2, but to a larger scale, and
FIG. 4 is a sectional view looking in the direction of arrows 4–4 in FIG. 3.

The seesaw has a support column 10 which is made either as a casting or by fabrication from steel plate, the column having two opposed vertical side walls 12 and two opposed end walls 14, the end walls being inclined inwardly towards the top. Walls 12 and 14 are secured to a fixed base 43.

The seesaw plank 38 is pivoted midway along its length by a spindle 15 engaging in journal bearings 16 secured to and carried in semi-circular recesses 18 in the side wall 12. A box beam 31 is secured by bolts 33 to the underside of the plank 38. The bolts 33 also secure a short channel member 42 to the underside of the box beam, and a circular plate 35 is secured to the central portion of each of the vertical sides of the channel member by being secured to pendulum plates 22 which in turn are fixed to beam 31. The plates 35 are concentric with the spindle 15, the spindle passing through a hole formed in the centre of each plate. A short boss 37 is secured to and projects downwardly from the underside of the channel member, the boss housing a bolt 39 which engages in a recess in the spindle 15, to lock the plank to the spindle.

Plates 20, curved concentrically about the pivotal axis, are secured to and extend between the circular plates 35 and are also secured, along one edge, to the underside of the channel member (which extends between the circular plates 35). The plates 20 enter the top of the column 10, the length of these curved plates being such that they never leave the column even when the plank is tilted to its extreme position in one direction or the other.

The curved plates fit closely inside the top ends of the end walls 14 so that a child cannot trap its fingers between the plates and the column.

Inside the column 10 a pendulum arm 24 extends downwardly, the pendulum arm comprising two parallel steel plates 22, the top ends of which are secured to the side walls of the box beam 31 so that the pendulum arm oscillates with the rocking of the seesaw. Two solid rubber or pneumatic tires 26 of the kind used on the wheels of vehicles are each free to rotate on a manganese bronze spindle 28, which extends between and is supported by the two plates 22, there being a self oiling washer 30 on each side of the wheel 26. The spindles 28 are arranged with their axes parallel with and vertically below the seesaw pivot axis (when the seesaw plank is horizontal), and each tire 26 projecting an equal amount on each side of the arm 24.

When the seesaw is in use, the arm 24 oscillates pendulum fashion, and as one end of the plank is approaching the ground, the arm presses its two tires against the inside of the column end wall 14 at the side where the plank is being raised. The tires will deform under the compressive load applied between the arm and the end wall, and this cushions the operation of the seesaw. In addition, the resilience of the tires helps the return motion of the seesaw.

The inclination of the end walls 14 is such that the upper tire engages in advance of the lower tire, the object of this arrangement being to ensure that both tires are compressed to the same extent when the seesaw is at the limit of its movement in either direction.

Supposing that the axis of the upper tire is half way between the seesaw pivot and the axis of the lower tire; then the lower tire will move at twice the velocity of the upper tire. The end walls are therefore inclined so that the upper tire is half compressed when the lower tire engages with the wall. Consequently, during the remainder of the movement, whilst the lower tire is moving through the distance to receive full compression, the upper tire will receive the second half of its full compression.

Plates 32 may be fixed inside the column under the path of movement of one or both tires so that the tires are rotated during the swinging of the arm, to ensure even distribution of wear. Also a rod 34 may project on each side of the arm 24 to provide a positive stop when its ends engage with blocks 36 secured to the end walls 14 of the column.

It will be appreciated that one advantage of the arrangement is that the seesaw is free except at the ends of its oscillation. Furthermore, the internal arrangement is very simple and requires very little attention.

It will be understood that a single tire may be effective in which case only one tire would be fitted, and, that more complicated buffer arrangements are possible.

What is claimed is:

1. A seesaw comprising a plank, a support column having two opposed end walls, means pivotally mounting said plank on said support column, a pendulum arm depending from said plank and within said support column, said pendulum arm carrying a buffer device adapted for engaging with either of said two opposed end walls of said column to cushion rocking movement of said plank, said buffer device comprising a ring of resilient material which will deform under compressive load to provide the cushioning effect.

2. A seesaw as claimed in claim 1, in which said ring of resilient material comprises a solid rubber tire.

3. A seesaw, as claimed in claim 1, in which said ring of resilient material comprises a rubber pneumatic tire.

4. A seesaw as claimed in claim 1, in which a plurality of vertically spaced resilient rings are provided on said pendulum arm.

5. A seesaw, as claimed in claim 4, in which said two opposed end walls against which said resilient rings engage slope inwardly towards the top of said support column.

6. A seesaw as claimed in claim 1, wherein said resilient ring is rotatably mounted about an axis on said pendulum arm.

7. A seesaw as claimed in claim 6 wherein relatively fixed surface means is provided within said column for engagement with said rotatable resilient ring in at least one direction of rocking of the plank to rotate the ring about its axis, for wear distribution.

8. A seesaw as claimed in claim 1, comprising solid stop means on said pendulum arm and said end walls for positive stopping of rocking movement of said plank after compression of said resilient ring.

9. A seesaw comprising a plank, a support box-beam secured beneath said plank, a channel member secured to the underside of said box-beam, a circular plate rigid with each side of said channel member, two curved safety plates secured between said circular plates, the upper edge of each of said safety plates abutting the underside of said channel member, a support column comprising two pairs of opposed walls one pair of said walls being vertical side walls, the other pair being end walls inclined inwardly towards the top of said support column, each of said vertical side walls defining a semi-circular recess, a base member to which said four walls are secured, a pendulum arm depending from said box-beam, said pendulum arm comprising two spaced steel plates, and provided with a pivot spindle, a journal bearing for each end of said spindle with each of said journal bearings engaging in one of said semicircular recesses, a locking member operative between said channel member and said pivot spindle to prevent rotation of said pivot spindle relative to said box-beam and said plank, said pendulum arm mounting two buffer device spindles, said buffer device spindles each mounting a rubber tire, each rubber tire being free to rotate on its spindle, two self oiling bushings being mounted on each buffer device spindle, one to either side of said tire, and a stop rod secured to said pendulum arm to engage with the end walls of said column for limiting swinging movement of said pendulum and said plank.

References Cited

UNITED STATES PATENTS

| 715,887 | 12/1902 | Smith | 272—52 |
| 1,998,508 | 4/1935 | Kappenberg | 272—52 X |
| 2,607,590 | 8/1952 | Wheaton | 272—54 X |
| 2,785,732 | 3/1957 | Prewitt | 272—52 |
| 3,168,310 | 2/1965 | Strausser | 272—54 |

FOREIGN PATENTS 24,983    1901    Great Britain.

ANTON O. OECHSLE, Primary Examiner

A. W. KRAMER, Assistant Examiner